(12) United States Patent
Baillot

(10) Patent No.: US 7,920,071 B2
(45) Date of Patent: Apr. 5, 2011

(54) AUGMENTED REALITY-BASED SYSTEM AND METHOD PROVIDING STATUS AND CONTROL OF UNMANNED VEHICLES

(75) Inventor: Yohann Baillot, Reston, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 922 days.

(21) Appl. No.: 11/715,339

(22) Filed: Mar. 8, 2007

(65) Prior Publication Data

US 2007/0273557 A1 Nov. 29, 2007

(51) Int. Cl.
*G08G 1/017* (2006.01)

(52) U.S. Cl. ............... 340/937; 340/573.1; 340/539.13; 342/44; 342/40; 345/7; 345/633; 345/632; 345/8; 701/207

(58) Field of Classification Search ............. 340/573.1, 340/10.34, 539.13; 342/44, 40; 345/7, 633, 345/632, 8; 375/239; 701/207; 702/186
See application file for complete search history.

(56) References Cited

U.S. PATENT DOCUMENTS

| | | | |
|---|---|---|---|
| 5,506,862 A | 4/1996 | McIntosh | |
| 6,166,744 A | 12/2000 | Jaszlics et al. | |
| 6,215,498 B1 | 4/2001 | Filo et al. | |
| 6,317,127 B1 | 11/2001 | Daily et al. | |
| 6,421,031 B1 | 7/2002 | Ronzani et al. | |
| 6,453,168 B1 | 9/2002 | McCrady et al. | |
| 6,466,232 B1 | 10/2002 | Newell et al. | |
| 6,474,159 B1 | 11/2002 | Foxlin et al. | |
| 6,500,008 B1 | 12/2002 | Ebersole et al. | |
| 6,607,038 B2 | 8/2003 | Ebersole et al. | |
| 6,616,454 B2 | 9/2003 | Ebersole et al. | |
| 6,675,091 B2 | 1/2004 | Navab | |
| 6,708,142 B1 | 3/2004 | Baillot et al. | |
| 6,757,068 B2 | 6/2004 | Foxlin | |
| 6,809,743 B2 | 10/2004 | Ebersole et al. | |
| 6,809,744 B2 | 10/2004 | Ebersole et al. | |
| 6,822,648 B2 | 11/2004 | Furlong et al. | |
| 6,853,972 B2 | 2/2005 | Friedrich et al. | |
| 6,856,324 B2 | 2/2005 | Sauer et al. | |
| 6,873,256 B2 | 3/2005 | Lemelson et al. | |
| 6,889,192 B2 | 5/2005 | Friedrich et al. | |
| 6,903,707 B2 | 6/2005 | Hobgood et al. | |
| 6,922,632 B2 | 7/2005 | Foxlin | |
| 6,962,277 B2 | 11/2005 | Quintana et al. | |
| 6,989,831 B2 | 1/2006 | Ebersole et al. | |
| 7,046,214 B2 | 5/2006 | Ebersole et al. | |
| 7,071,898 B2 | 7/2006 | Hobgood et al. | |

(Continued)

OTHER PUBLICATIONS

"Boeing", printed from http://ovrt.nist.gov/projects/mfg/mfg_cs_boeing.html on Mar. 30, 2006 (2 pp.).

(Continued)

*Primary Examiner* — Daryl Pope
(74) *Attorney, Agent, or Firm* — Davidson Berquist Jackson & Gowdey, LLP

(57) ABSTRACT

An augmented reality system identifies and controls a vehicle located within an environment. A tracking system obtains viewpoint information corresponding to a real-time view of the environment. A processing system receives information from one or more sensors. Information includes sensor location information and status information about the vehicle. Processing system generates graphics using said sensor location information and said viewpoint information. Graphics include visual representations of said status information and controls. A display displays the generated graphics such that the graphics are superimposed on the real-time view. The graphics appear attached to the vehicle. An interaction device activates a displayed control.

16 Claims, 7 Drawing Sheets

U.S. PATENT DOCUMENTS

Figure 1:
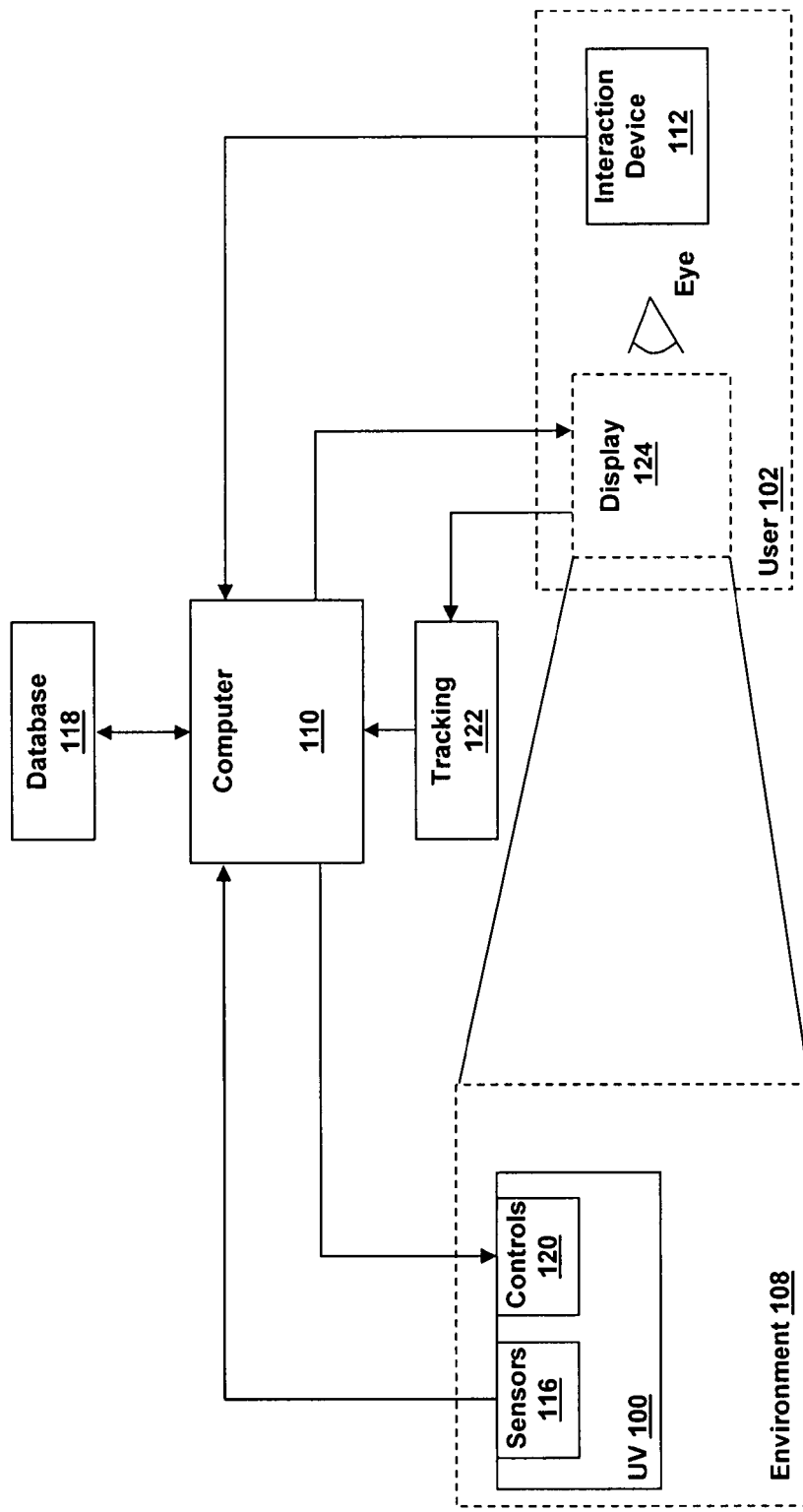

| | | | |
|---|---|---|---|
| 7,110,013 | B2 | 9/2006 | Ebersole et al. |
| 7,138,963 | B2 | 11/2006 | Hobgood et al. |
| 7,215,322 | B2 | 5/2007 | Genc et al. |
| 7,245,273 | B2 | 7/2007 | Eberl et al. |
| 2002/0008153 | A1 | 1/2002 | Ebersole et al. |
| 2002/0039085 | A1 | 4/2002 | Ebersole et al. |
| 2002/0044104 | A1 | 4/2002 | Friedrich et al. |
| 2002/0057340 | A1 | 5/2002 | Fernandez et al. |
| 2002/0069072 | A1 | 6/2002 | Friedrich et al. |
| 2002/0074370 | A1 | 6/2002 | Quintana et al. |
| 2002/0140694 | A1 | 10/2002 | Sauer et al. |
| 2002/0140708 | A1 | 10/2002 | Sauer et al. |
| 2002/0140709 | A1 | 10/2002 | Sauer et al. |
| 2002/0160343 | A1 | 10/2002 | Ebersole et al. |
| 2002/0191003 | A1 | 12/2002 | Hobgood et al. |
| 2002/0197591 | A1 | 12/2002 | Ebersole et al. |
| 2003/0003430 | A1 | 1/2003 | Ebersole et al. |
| 2003/0017438 | A1 | 1/2003 | Ebersole et al. |
| 2003/0037449 | A1 | 2/2003 | Bani-Hashemi |
| 2003/0040914 | A1 | 2/2003 | Friedrich et al. |
| 2003/0050785 | A1 | 3/2003 | Friedrich et al. |
| 2004/0080467 | A1 | 4/2004 | Chinthammit et al. |
| 2004/0105427 | A1 | 6/2004 | Friedrich et al. |
| 2004/0149036 | A1 | 8/2004 | Foxlin et al. |
| 2004/0201857 | A1 | 10/2004 | Foxlin |
| 2004/0212630 | A1 | 10/2004 | Hobgood et al. |
| 2005/0093889 | A1 | 5/2005 | Sauer et al. |
| 2005/0168403 | A1 | 8/2005 | Ebersole et al. |
| 2005/0177375 | A1 | 8/2005 | Friedrich et al. |
| 2005/0195279 | A1 | 9/2005 | Hobgood et al. |
| 2005/0203380 | A1 | 9/2005 | Sauer et al. |
| 2005/0232499 | A1 | 10/2005 | Ha et al. |
| 2006/0043314 | A1 | 3/2006 | Katzir et al. |
| 2006/0071775 | A1 | 4/2006 | Otto et al. |
| 2006/0241792 | A1 | 10/2006 | Pretlove et al. |
| 2007/0016372 | A1 | 1/2007 | Browne et al. |
| 2007/0098238 | A1 | 5/2007 | Obrador |

OTHER PUBLICATIONS

"Microvision: Applications", printed from http://www.microvision.com/apps.html, May 10, 2006, 1 page.

"Microvision: Benefits & Features", printed from http://www.microvision.com/nomad_benefits.html, May 10, 2006, 2 pages.

"Microvision: Nomad Display Systems", printed from http://www.microvision.com/nomad.html, May 10, 2006, 1 page.

"NOMAD Expert Technician System" (2004), Microvision, www.microvision.com/nomad (2 pp.).

Azuma R., Baillot Y., Feiner S., Julier S., MacIntyre B., Reinhold B. (2001) "Recent Advances in Augmented Reality", IEEE CG&A.

Baillot Y, Gagas E, Höllerer T, Julier S, Feiner S (2000) "Wearable 3D graphics for augmented reality: a case study of two experimental backpack computers", NRL Technical Report.

Baillot Y., Brown D., Julier S. (2001) "Authoring of Physical Models Using Mobile Computers", ISWC2001, Zurich, Oct. 2001.

Baillot Y., Eliason J., Schmidt G., Swan E., Brown D., Julier S., Livingston M., Rosenblum L. (2003) "Evaluation of the ShapeTape tracker for Wearable, Mobile Interaction", VR2003, Los Angeles, Mar. 2003.

Baillot Y., Julier S., Brown D., Livingston M. (2003) "A Tracker Alignment Framework for Augmented Reality", ISMAR 2003, Tokyo, Oct. 2003.

Baillot, Y (1998) "First Implementation of the Virtual Reality Dynamic Anatomy (VRDA) tool", Master thesis dissertation, School of Computer Sciences, University of Central Florida.

Baillot, Y (1999) "Study on spherical tracking probes design", CREO/UCF, Technical Report 99-01.

Baillot, Y., & Rolland, J. (1996) "Fundamental principles of tracking technology for virtual environments", CREO/UCF, Technical Report 96-04.

Baillot, Y., & Rolland, J. (1996) "Improvement of an Augmented Reality Bench Prototype", Engineering degree final report, CREO/UCF, Technical Report 96-01.

Baillot, Y., J.P. Rolland, K. Lin, and D.L. Wright (2000) "Automatic modeling of knee-joint motion for the virtual reality dynamic anatomy (VRDA) tool" Presence: Tele operators and Virtual Environments (MIT Press) 9(3), 223-235.

Baillot, Y., Rolland, J.P., & Wright, D.L. (1999) "Automatic Modeling of knee -joint motion for the Virtual Reality Dynamic Anatomy Tool (VRDA)", Proceedings of Medicine Meets Virtual Reality 99, IOS Press.

Brown D., Baillot Y., Bailey M.P., Pfluger K.C., Maassel P., Thomas J., Julier S. "Using Augmented Reality to Enhance Fire Support Team Training", I/ITSEC 2005, Orlando, FL, Dec. 2005.

Brown D., Baillot Y., Julier S., Armoza D., Eliason J., Livingston M., Rosenblum L., Garrity P. (2003) "Data Distribution for Mobile Augmented Reality System in Simulation and Training", IITSEC, Florida, Dec. 2003.

Brown D., Julier S., Baillot Y. (2003) "An Event-Based Data Distribution Mechanism for Collaborative Mobile Augmented Reality and Virtual Environments", Proceedings of VR2003, Los Angeles, Mar. 2003.

Brown D., Julier S., Baillot Y., Livingston M., Rosenblum L. (2004) "Event-Based Data Distribution for Mobile Augmented Reality and Virtual Environments", Presence: Teleoperators and Virtual Environments, vol. 13, Issue 2, Apr. 2004.

Davis, L., Rolland, J.P., & Baillot, Y. (1998) "Probe design for Tracking Based on LED imaging", CREO/UCF, Technical Report 98-03.

Foxlin E., Altshuler Y., Naimark, L. Harrington M. (2004) "Flight-Tracker: A Novel Optical/Inertial Tracker for Cockpit Enhanced Vision", IEEE/ACM ISMAR 2004, Washington D.C. Nov. 2004.

Foxlin E., Naimark, L. (2003) "Miniaturization, Calibration & Accuracy Evaluation of a Hybrid Self-Tracker", IEEE/ACM ISMAR 2003, Tokyo, Oct. 2003.

Foxlin, E. (2000) "Head-tracking relative to a moving vehicle or simulator platform using differential inertial sensors", Proceedings of Helmet and Head-Mounted Displays V, SPIE vol. 4021, AeroSense Symposium, Orlando, FL, Apr. 2000.

Foxlin, Eric et al., "VIS-Tracker: A Wearable Vision-Inertial Self-Tracker", IEEE VR2003, Mar. 22-26, 2003, Los Angeles, 8 pages.

Foxlin, Eric, "Generalized Architecture For Simultaneous Localization, Auto-Calibration, and Map-Building", IEEE/RSJ Conf. On Intelligent Robots and Systems (IROS 2002), Oct. 2-4, 2002, 7 pages.

Gabbard J., Hix D., Swan E., Livingston M., Hollerer T., Julier S., Brown D., Baillot Y. (2003) "Usability Engineering for Complex Interactive Systems Development", HSIS 2004, Vienna, VA, Jun. 2003.

Hix D., Gabbard J., Swan II E., Livingston M., Höllerer T., Julier S., Baillot Y., Brown D (2004) "A Cost-Effective Usability Progression for Novel Interactive Systems", HICSS 2004, Hawaii, Jan. 2004.

Höllerer T., Feiner S., Hallaway D., Bell B., Lanzagorta M., Brown D., Julier S., Baillot Y. and Rosenblum L. (2001) "User interface management techniques for collaborative mobile augmented reality", Computers & Graphics, vol. 25, Issue 5, Oct. 2001, pp. 799-810.

Julier S., Baillot Y., Lanzagorta M., Rosenblum L. and Brown D. (2001) "Urban Terrain Modeling for Augmented Reality Applications", in M. Abdelguerfi (Ed.), 3D Synthetic Environments Reconstruction (pp. 119-136). Dordrecht, The Netherlands: Kluwer Academic Publishers 2001.

Julier S., Brown D., Baillot Y. (2001) "The need for AI: Intuitive User Interfaces for Mobile Augmented Reality Systems", AIMS2001, Seattle.

Julier S., Lanzargota M., Baillot Y., Brown D. (2002) "Information Filtering for Mobile Augmented Reality", 2002, IEEE CG&A.

Julier, S., Baillot, Y., Lanzagorta, M., Brown, D., Rosenblum, L. (2000) "BARS: Battlefield Augmented Reality System", NATO Symposium on Information Processing Techniques for Military Systems, Istanbul, Turkey, Oct. 9-11, 2000.

Julier, S., Lanzagorta, M., Baillot, Y., Rosenblum, L., Feiner, S., Höllerer, T., Sestito, S. (2000) "Information Filtering for Mobile Augmented Reality", Proceedings IEEE International Symposium on Augmented Reality Oct. 5-6, 2000, Munich, 3-11.

Livingston M., Brown D., Swan II E., Goldiez B., Baillot Y., Schmidt G. S. (2005) "Applying a Testing Methodology to Augmented Reality Interfaces to Simulation Systems", Western Simulation Multiconference (WMC '05), New Orleans, LA, Jan. 23-27, 2005.

Livingston M., Rosenblum L., Julier S., Brown D., Baillot Y., Swan E., Gabbard J., Hix D. (2002) "An Augmented Reality System for Military Operations in Urban Terrain", IITSEC, Florida, Dec. 2002.

Livingston M., Swan E., Gabbard J., Höllerer T., Hix D., Julier S., Baillot Y., Brown D.(2003) "Resolving Multiple Occluded Layers in Augmented Reality", ISMAR 2003, Tokyo, Oct. 7-10, Tokyo, Japan.

Memi, E. (Nov. 2005), "Boeing celebrates five years of continuous human presence on ISS", Boeing Frontiers Online, printed from http://www.boeing.com/news/frontieres/archive/2005/november/i_ids1.html.

Nash, J. (Oct. 1997), "Wiring the Jet Set", printed from http://www.wired.com/wired/5.10/wiring_pr.html on Mar. 30, 2006 (2 pp.).

Rolland, J.P., Y. Baillot, and A. Goon (2000) "A survey of tracking technology for virtual environments", in Augmented Reality and Wearable Computers. Ed. Barfield and Caudell (Mahwah, NJ), (2000).

Rolland, J.P., Y. Baillot, L. Davis, L. Vaissie, and Wright D.L. (1998) "Role of optics in virtual environments" Invited, Proceeding of the International Lens Design Conference, Hawaii.

Samad, T., Bay, J. S., Godbole, D., "Network-Centric Systems for Military Operations in Urban Terrain: The Role of UAVs", Proceedings of the IEEE, vol. 95, No. 1, Jan. 2007, pp. 92-107.

Schmidt G., Brown D. G., Tomlin B. E., Swan II E., Baillot Y. "Toward Disambiguating Multiple Selections for Frustum-Based Pointing", VR2006, 3DUI Symposium, Washington DC, 2006.

Schmidt G., Brown D. G., Tomlin E. B., Swan II E, Baillot Y. Probabilistic Algorithms, Integration, and Empirical Evaluation for Disambiguating Multiple Selections in Frustum-Based Pointing. Journal of MultiMedia (JMM) 2006, September issue.

Simon Julier, Mark A. Livingston, J. Edward Swan II, Yohan Baillot, Dennis Brown, "Adaptive User Interfaces in Augmented Reality", in Proceedings of the Workshop on Software Technology for Augmented Reality Systems, at the International Symposium on Mixed and Augmented Reality (ISMAR '03) Oct. 7-10, 2003, Tokyo, Japan.

Starner, T., Mann, S., Rhodes, B., Levine, J., Healey, J., Kirsch, D., Picard, R. W., Pentland, A., "Augmented Reality Through Wearable Computing", M.I.T. Media Laboratory Perceptual Computing Section Technical Report No. 397, 1997, pp. 1-9.

Swan II E., Livingston M. A., Smallman H. S., Brown D., Baillot Y., Gabbard J. L, Hix D., "A Perceptual Matching Technique for Depth Judgments in Optical, See-Through Augmented Reality", Technical Papers, Proceedings of IEEE Virtual Reality 2006, Alexandria, Virginia, USA Mar. 25-29, pp. 19-26.

International Search Report and Written Opinion, mailed Jul. 28, 2008 in PCT application PCT/US08/03037.

International Search Report and Written Opinion mailed Sep. 2, 2008 in PCT/US07/11288.

U.S. Appl. No. 11/441,241—Jun. 25, 2009 PTO Office Action.
U.S. Appl. No. 11/715,338—Apr. 16, 2009 PTO Office Action.
U.S. Appl. No. 11/441,241—May 11, 2010 PTO Office Action.
U.S. Appl. No. 11/715,338—May 12, 2010 PTO Office Action.
U.S. Appl. No. 11/441,241—Aug. 2, 2010 PTO Office Action.

AUGMENTED REALITY-BASED SYSTEM AND METHOD PROVIDING STATUS AND CONTROL OF UNMANNED VEHICLES

CROSS-REFERENCE TO RELATED APPLICATIONS

The present invention is related to the following co-pending U.S. patent applications, the entire contents of each of which are incorporated herein by reference:
1. U.S. application Ser. No. 11/441,241 entitled "System and Method to Display Maintenance and Operation Instructions of an Apparatus Using Augmented Reality," filed May 26, 2006; and
2. U.S. application Ser. No. 11/715,338 entitled "Augmented Reality-Based System and Method to Show the Location of Personnel and Sensors Inside Occluded Structures and Provide Increased Situation Awareness" filed Mar. 8, 2007.
3. U.S. application Ser. No. 11/516,545 entitled "Method and System for Geo-Referencing and Visualization of Detected Contaminants," filed Sep. 7, 2006.

FIELD OF THE DISCLOSURE

This relates to using augmented reality-based systems with unmanned vehicles (UV).

INTRODUCTION

It has long been desirable to provide a remote user with control of an unmanned vehicle (UV) in such a way that the remote user can easily navigate the unmanned vehicle through a complex and three-dimensional urban environment.

Prior art systems include: Operator-vehicle interface (OVI), Uninhabited Combat Aerial Vehicle (UCAV) Operator's Console, Advanced Unmanned Air Vehicle Interface (AUAVI), Common Operator Control Unit (COCU), systems developed by the Air Force Research Lab at the Wright Patterson Air Force base, and systems developed by the Space and Naval Warfare Systems Center San Diego.

Prior art systems typically attempt to navigate a UV through a complex environment by using command and control concepts involving computer graphics or by using Tele-operation. Existing command and control concepts involving computer graphics are based on Virtual Reality or Augmented Virtuality. Tele-operation does not involve any graphics, but just provides the viewpoint of the UV to the control user using a video from a video camera attached to the UV.

Virtual Reality is adapted to long range command and control where the UV is not visible to the user. In close-range/urban situations, virtual reality cannot effectively be applied, as it requires detailed models of the urban environment which typically do not exist and even if the models existed they would not include new changes (e.g. a car moving in the environment) that are of concern when controlling a UV, particularly through a narrow urban canyon. Virtual Reality control is best employed for large motion and large overhead views and therefore is best suited for long range UV control where obstacles and difficult terrain are far from the UV. In long range UV control, it is of less concern if distant obstacles are not detailed. Having a rough representation of overall topology is typically sufficient.

Tele-operation shows an image of the environment from the viewpoint of the UV and provides the control of the UV using this image. Tele-operations attempt to control a UV by creating an image as if the user were inside the UV. Tele-operation reduces the field of view of the controller to the view of the camera attached to the UV and the controller's ability to look around is limited by the speed at which the camera can rotate. Both the view of the camera and the speed at which it can rotate are inferior to the capabilities of a human. Thus, peripheral situational awareness is greatly diminished compared to a user actually inside the vehicle. Consequently, the control of the UV is reduced as well. For example, it is much more difficult to go through a narrow tunnel without hitting the walls by using a camera for the view of the environment than it is with the large field of view and the look-around capability of human vision.

Augmented Virtuality is employed to superimpose the video of the current view of a UV on top of a virtual model of the environment. The video collected and thus mapped on the virtual world provides the controller with updates of what really happens in the environment as currently seen by the camera. Augmented Virtuality suffers from the same limitations as the above mentioned systems, as the image the human controller sees is limited by the capabilities of the camera and the virtual model of the environment does not account for small changes in the environment.

In addition to the limitations described above, all the above mentioned techniques require the use of remote command centers or at best traditionally large and heavy remote that is carried by an operator to control in most cases a single UV. As a consequence, only one user can control a given UV as well. So, for a soldier to be able to use a given UV, the soldier must first find the UV's human controller and let the human controller know what he needs the UV to do. In addition, none of these methods allow identifying a specific UV in the real world. As a consequence, it might be difficult for a user to find a UV in the environment or differentiate two similar UVs which are far away.

The system described herein solves the shortcomings of prior art systems by allowing a UV to be identified and controlled from the point of view of any user able to see the UV, thereby allowing close collaboration between any user and the UV. In the case where there are multiple UVs within an environment, the system allows a UV in the environment to be distinguished from other similarly looking UVs in the environment. The system allows a UV to be controlled by using a control interface that is rendered into a see-through display worn by the user, thereby removing the need for a large and heavy remote control. The control interface can be implemented by attaching control widgets (buttons, knobs, etc) to UVs displayed on the user's view. The UVs can then be controlled by the acting on these widgets. Further, the system enables each individual UV to be controlled by several users of the augmented reality system.

BRIEF DESCRIPTION OF THE PRESENTLY PREFERRED EXEMPLARY EMBODIMENTS

Figure 2:
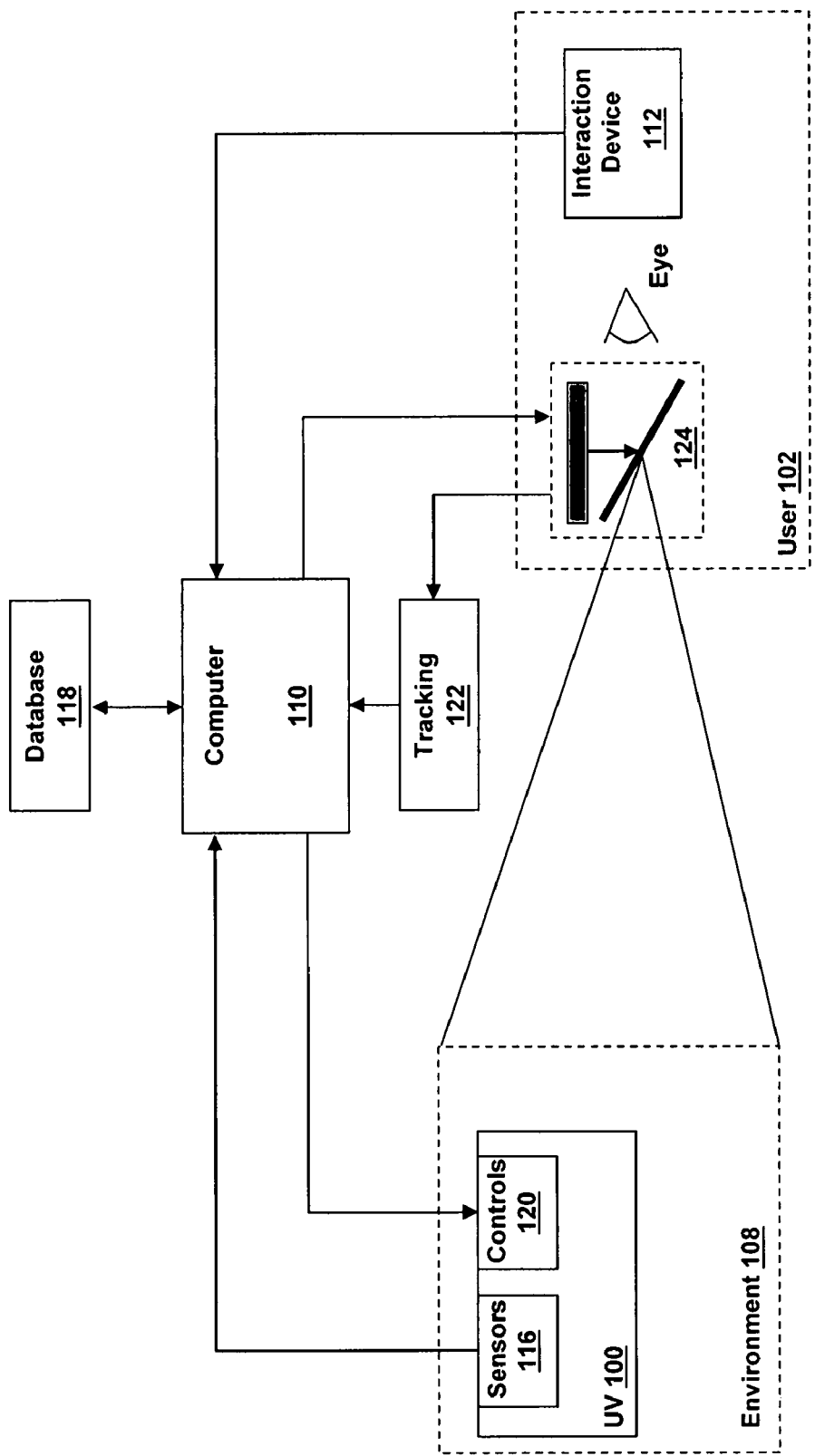
Figure 3:
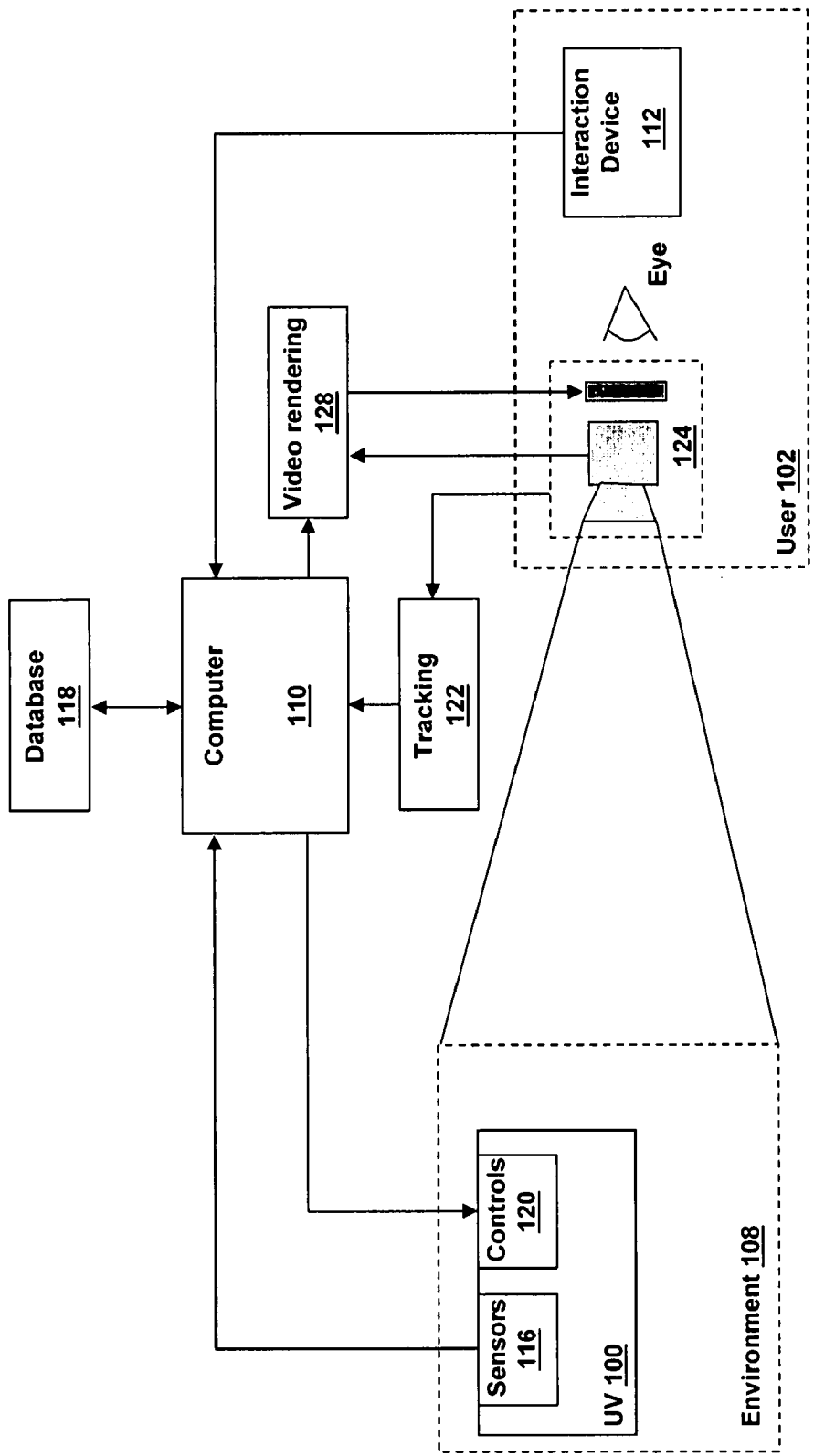
Figure 4:
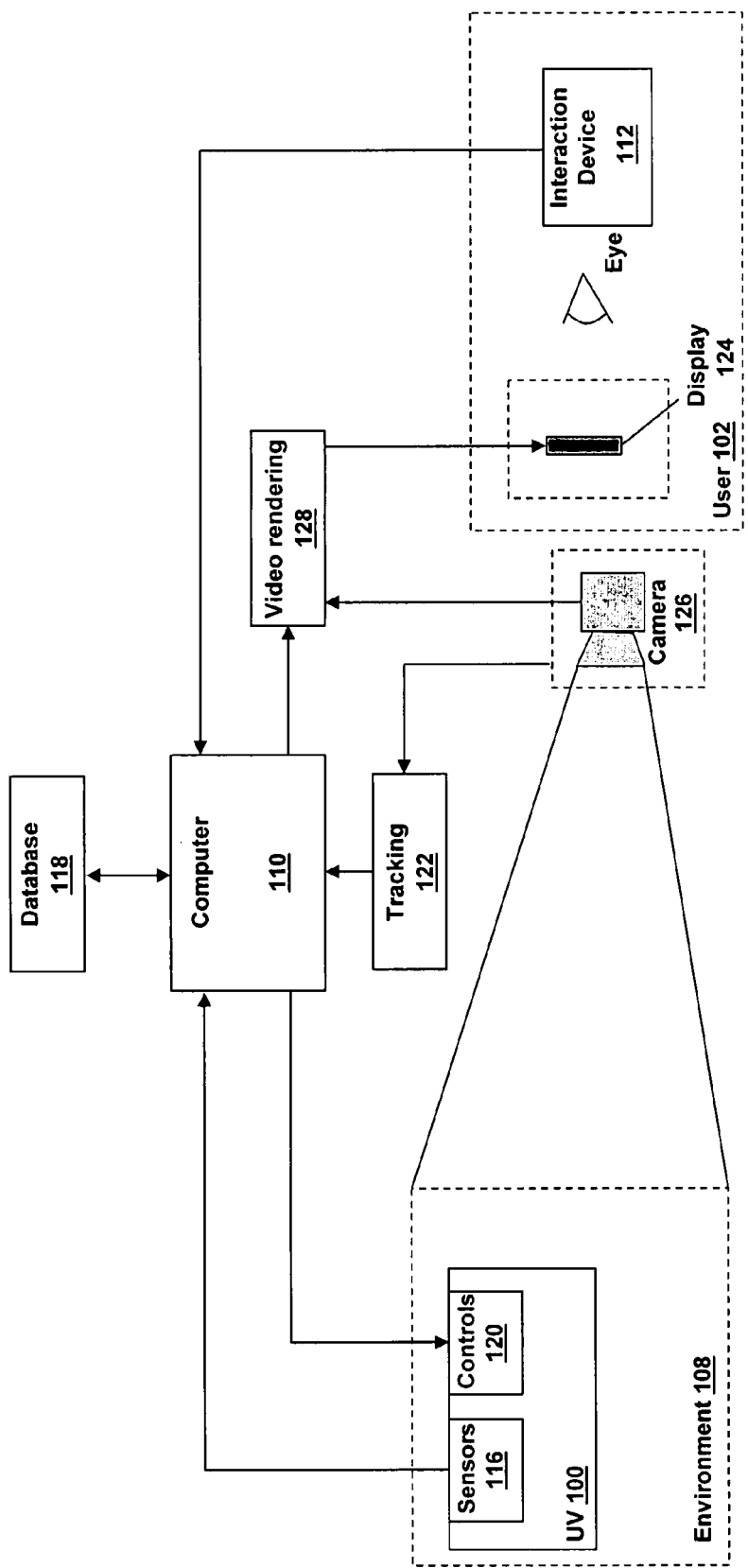
Figure 5:
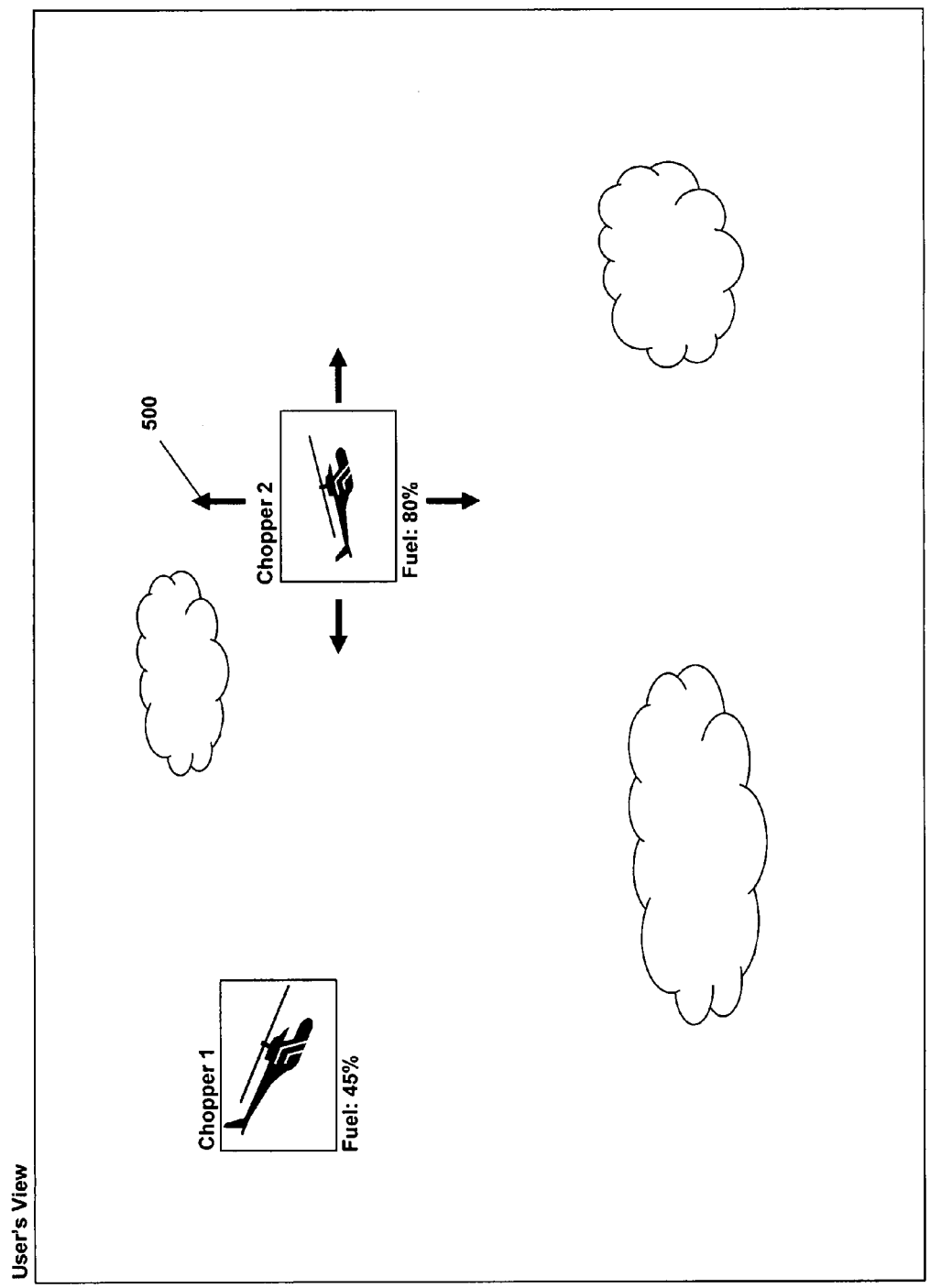
Figure 6:
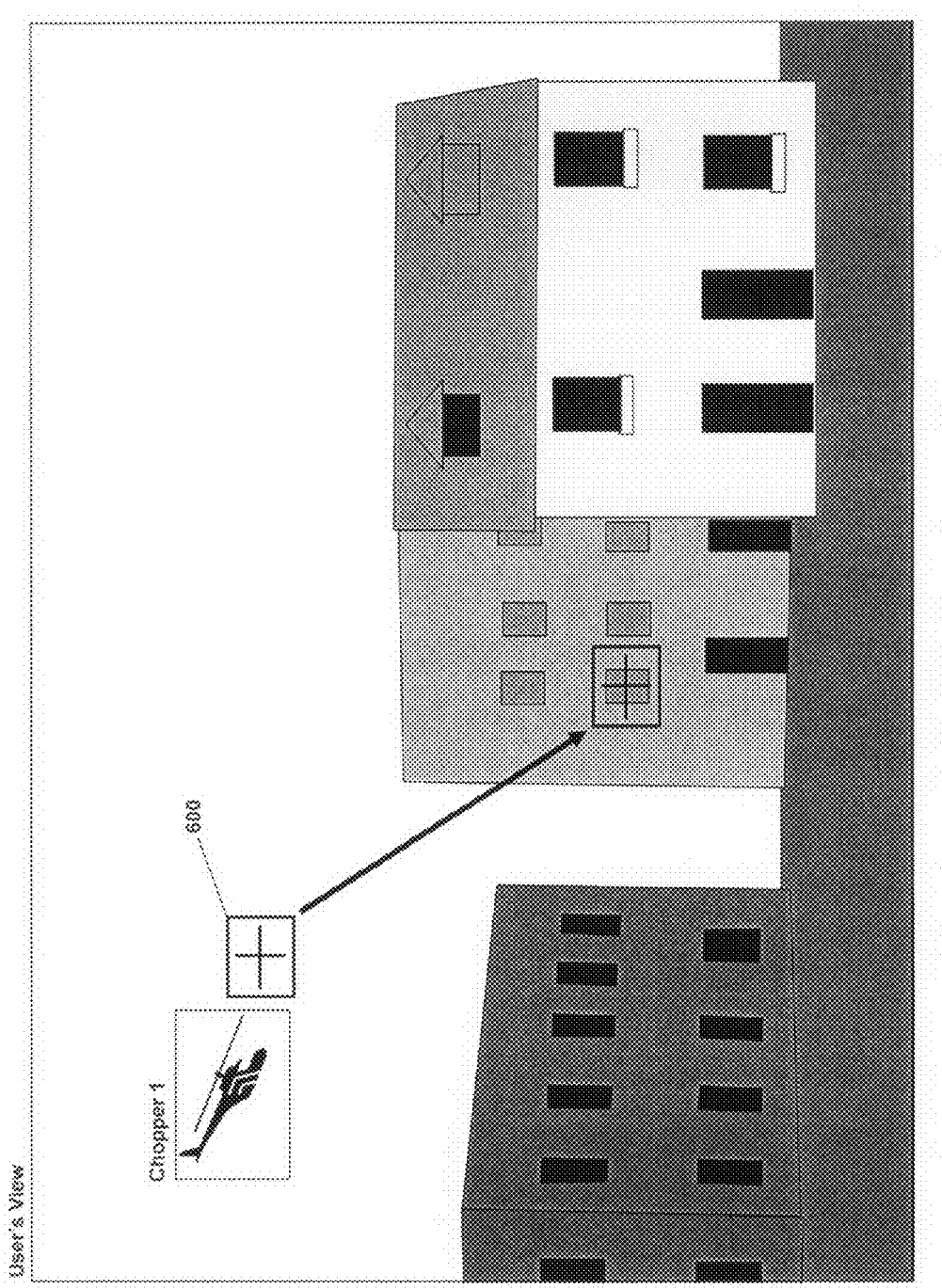
Figure 7:
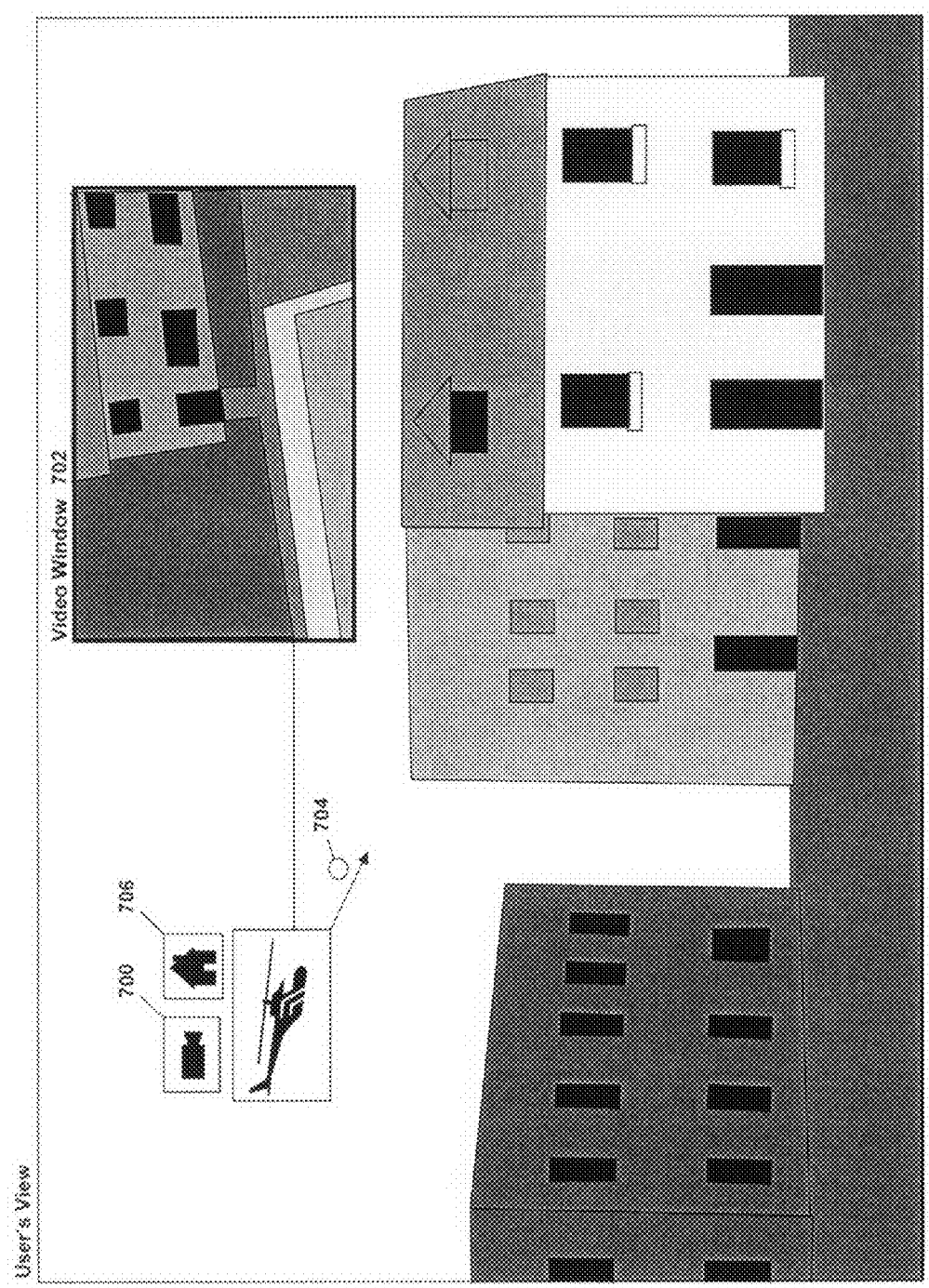

The following description, given with respect to the attached drawings, may be better understood with reference to the non-limiting examples of the drawing, wherein the drawings show:

FIG. 1: Exemplary UV information and control system;

FIG. 2: Exemplary UV information and control system using an optical see-through display;

FIG. 3: Exemplary UV information and control system using a video see-through display;

FIG. 4: Exemplary UV information and control system using a camera and video display potentially at different locations;

FIG. 5: Exemplary view of information superimposed on top of a view of an environment with exemplary UV identification and control information;

FIG. 6: Exemplary view of information superimposed on top of a view of an environment with exemplary UV identification and control information;

FIG. 7: Exemplary view of information superimposed on top of a view of an environment with exemplary UV identification and control information.

THE PRESENTLY PREFERRED EXEMPLARY EMBODIMENTS

The status and control system described herein makes use of Augmented Reality (AR) technology to show the information directly in the view of the user. AR is like Virtual Reality, but instead of using completely artificial images, AR superimposes 3D graphics on a video or a view, by transparency, of the real world. A very simple example of AR is used in football games to show the first down with a yellow line. An example AR system that can be employed is one of the examples described in U.S. application Ser. No. 11/441,241 in combination with the present disclosure.

The AR visualization system comprises: a spatial database, a graphical computer, a viewpoint tracking device, a display device, and an interaction device.

The working principle of an Augmented Reality system is described below. A display device that displays dynamic images corresponding to a user's view is tracked. That is, the display's position and orientation are measured by a viewpoint tracking device. A spatial database and a graphical computer contain information relating to objects in the environment which can be the UVs and geolocated data captured by these UVs. This information is superimposed on top of the environment using the see-through display in accordance with the display's position and orientation, thereby creating an augmented image. The interaction device allows UVs shown in the augmented image to be controlled. The interaction device allows the user to select a specific point of what he sees through the display (for example a window or a widget).

FIG. 1 shows an exemplary embodiment of an AR system used to provide a remote user 102 with a way of viewing and controlling a UV 100. User 102 is located some distance away from UV 100 and has a perspective of the environment 108 that allows user 102 to view the UV 100 in the context of the environment 108.

Sensors 116 include sensors that allow a UV's location to be monitored (e.g. GPS tracking information) and can include sensors that provide information about the operating conditions of the UV (e.g. remaining power or fuel, video captured by the UV, etc.), and conditions within the UV's immediate vicinity (e.g. temperature, air content, chemical samples captured by the UV, a LIDAR sensor attached to the UV, etc.). Controls 120 receive commands and use commands to control the UV 100.

Computer 110 collects information from sensors 116 attached to UV 100. It should be noted that although FIG. 1 shows a single UV 100 such a representation is not intended to be limiting and any number of UVs 100 could be located within the environment 108.

Computer 110 updates database 118 with the information received from sensors 116. Database 118 stores the information from sensors 116. Database 118 may additionally contain model information about the environment 108, such as a 3D model of a city. Model information may be used to provide advanced functionality in the system, but is not necessary for basic system implementation. Graphical computer 110 continuously renders information from the database 118, thereby monitoring a UV's location within the environment and generating graphics from current information received from sensors 116. Graphical computer 110 associates generated graphics from information received from a particular UV with that UV's current location.

Computer 110 also receives information regarding the viewpoint of the see-through display device 124 captured by the tracking device 122. Computer 110 takes rendered information from database 118 and tracking information about the viewpoint of the display device 124 and places current information from sensors 116 in relation to the current view of the display device 124 by using a common 3D projection process. Since computer 110 associates information from a UV with the UV's location, when computer 110 places information from sensors 116 in a current view, information is attached to UV 100.

The display device 124 is able to show the image generated by the graphical computer 110 superimposed on a view of the surrounding environment 108 as "seen" by the display device 124. Thus, user 102 has an augmented view of environment 108 with information superimposed thereon that allows user 102 to interpret visualize information received from a UV 100. By attaching graphics to a UV 100, corresponding information remains visually associated with a UV 100 as the UV 100 moves through a static user view or as the user's view changes.

Further, graphics can include controls that allow a user to control a UV 100. Interaction device 112 allows a user 100 to manipulate controls displayed on display 124. Thus, interaction device 112 can include any device that can interact with a GUI, e.g. a mouse, a gyro-mouse, a joystick, etc. When the interaction device 112 is a mouse, the interaction device can have a pointer being displayed in the field of view of the user 102 which allows user 102 to see what is currently selected by the interaction device 112. Using the interaction device 112, user 102 can select a part of the displayed graphics and perform an action on it. Although a mouse is described, any interaction device allowing the user 102 to select a part of the image that he sees can be used. For example, a camera can be embedded in the display that "looks" at the same picture that the user 102 sees. In this example, user 102 could use his finger as a pointing device. The camera would capture the finger and attach a cursor at the tip of the finger so that pointer can then be driven by the tip of the finger to select a part of the display. Since there is no mouse button available in this case, may be the user 102 would speak or push a button in his gloves to perform the actual selection once above the area that he wants to select. Details of specific exemplary functions available to interaction device 112 are described in accordance with FIGS. 5-7.

FIGS. 2-4 illustrate the exemplary types of displays that can be incorporated into the system. FIG. 2 shows display device 124 implemented using an optical see-through display. Optical see-through displays achieve showing the image generated by the graphical computer 110 superimposed on a view of the surrounding environment 108 typically by using an optical beam splitter (there are other optical assembly existing) that lets through half of the light coming from environment 108 in front and reflecting half of the light coming from a display 124 showing the image generated by the graphical computer 110, in effect combining the real world environment 118 and the graphics. Optical see-through displays are typically in the form of goggles that are worn by the user.

FIG. 3 shows the display device 124 implemented using a video see-through display. Video see-through displays achieve showing the image generated by the graphical computer 110 superimposed on a view of environment 108 by using a video camera 126 to take the video of environment 108 and show it on the display 124 after the image from the graphical computer 110 has been overlaid on top of it using video rendering device 128. In the case of a video see-through display, the camera capturing the view of the real world environment 108 and the display showing this video can be co-located in a single display device as shown in FIG. 3 or placed at different locations as shown in FIG. 4. Video displays can be implemented using various types of display technologies and can be located anywhere in proximity to user 102.

The three exemplary configurations (optical see-through, co-located video and screen, and video and screen at different locations) described above are mentioned for understanding the implementation of an AR system and are not intended to be limiting. Any AR system which is able to superimpose graphics that appear attached to the real world could be used.

It should be noted that the elements shown in FIGS. 1-4 can be combined in any number of ways when appropriate (e.g. tracking 122 and computer 110 can be combined within the same physical device). Further, the elements shown can be distinct physical devices that communicate with each other in any appropriate manner. For example, sensors 116 can communicate with computer 110 via radio communications, across a network using network protocols, or using any other appropriate method of electronic communications.

FIG. 5 is an exemplary view of information superimposed on top of a view of an environment 108 with exemplary UV identification and control GUI. FIG. 5 illustrates the principle of identifying unambiguously two similar UVs within the same environment. In this example, the similar UVs are distinguished by unique identifiers, "Chopper 1" and "Chopper 2." Further, information can be shown regarding the state of each UV. In this example, below each UV is an indication of the amount of fuel each UV has left (i.e. 45% and 80%). Any other characteristics or status information could be included with or instead of the fuel reading. As the UVs move throughout the environment the information (e.g. unique identifiers) remain "attached" to the UVs.

FIG. 5 also illustrates the concept of using an augmented display to provide control functions to a UV. As shown in FIG. 5, Chopper 2 is surrounded by directional arrows 500. A user 102 can control Chopper 2 by manipulating an arrow using interaction device 112. Computer 110 receives the commands from the interaction device 112 and transmits commands to the controls 120 of a UV 100. In this case, manipulating a particular arrow might cause Chopper 2 to move in that direction.

FIG. 6 illustrates an alternative control interface for controlling a UV. As shown in FIG. 6, there is a cross 600 next to the UV. A user 102 is able to control the UV by selecting the cross 600 with interaction device 112 and dragging and dropping the cross 600 to a particular location in the environment, thereby indicated to the UV to go to this location. Since the pointing/interaction device is 2D (like the display), it is necessary that a model of the environment exists in this case so that the depth is constrained (here to the depth of the window).

FIG. 7 illustrates the concept of using a control interface to gather information from a UV. As shown in FIG. 7 the control interface includes a video button 700 above the UV. Pushing video button 700 causes video captured from a camera on the UV to be displayed in a video window 702. Button 704 allows the user 102 to change the position of the camera, thereby controlling what the camera is capturing. It should be noted that when model information is incorporated in the system, it can be used to prevent occlusion of a landmark by video window 702. FIG. 7 also illustrates the general use of action buttons. In addition to gathering information from a UV, action buttons can perform any number of predetermined functions. For example, action button 706, when activated, makes the UV return to the home base. Action buttons can also make a UV perform a series of steps so that complex operations can be completed. For example, an action button could make a UV perform all the steps necessary for a refueling operation.

It should be noted that the GUI control system is not limited to a UV and can include any type of electro-mechanical devices. For example, the system could be used for controlling robots where the robots are stationary, but have tools that can be controlled (e.g. welding, drilling, etc.).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method of identifying and controlling a vehicle located within an environment comprising the steps of:
   receiving information from one or more sensors coupled to the vehicle, where the information includes sensor location information and status information about the vehicle;
   obtaining viewpoint information corresponding to a real-time view of said environment;
   generating graphics using said sensor location information and viewpoint information, wherein the graphics include visual representations of the status information and controls;
   displaying the generated graphics on a display such that the graphics are superimposed on the real-time view, wherein the graphics appear attached to the vehicle; and
   activating a displayed control.

2. The method of claim 1, wherein visual representations of status information include:
   an identifier that identifies the vehicle.

3. The method of claim 1, wherein the displayed control includes:
   an action button that when activated displays information captured from a number of said one or more sensors coupled to the vehicle.

4. The method of claim 1, wherein the displayed control includes:
   arrows that upon being selected move the vehicle in the direction selected.

5. The method of claim 1, wherein the displayed control includes:
   an icon next to a vehicle that upon being moved to a location moves the vehicle to a corresponding location.

6. The method of claim 1, wherein the displayed control includes:
   an action button next to a vehicle that upon being activated commands the vehicle to move to a predetermined location.

7. The method of claim 1, wherein the displayed control includes:
   an action button next to a vehicle that upon being activated commands the vehicle to perform a series of operations.

8. An augmented reality system for identifying and controlling a vehicle located within an environment comprising:
   one or more sensors coupled to the vehicle;
   a tracking system that obtains viewpoint information corresponding to a real-time view of said environment;
   a processing system that receives information from said one or more sensors, where the information includes sensor location information and status information about the vehicle, and generates graphics using said sensor location information and said viewpoint information, wherein the graphics include visual representations of said status information and controls; a display that displays the generated graphics such that the graphics are superimposed on the real-time view, wherein the graphics appear attached to the vehicle; and an interaction device that activates a displayed control.

9. The augmented reality system of claim 8, wherein visual representations of status information include:

an identifier that identifies the vehicle.

10. The augmented reality system of 8, wherein the displayed control includes:

an action button that when activated displays information captured from a number of said one or more sensors coupled to the vehicle.

11. The augmented reality system of claim 8, wherein the displayed control includes:

arrows that upon being selected move the vehicle in the direction selected.

12. The augmented reality system of claim 8, wherein the displayed control includes:

an icon next to a vehicle that upon being moved to a location moves the vehicle to a corresponding location.

13. The augmented reality system of claim 8, wherein the displayed control includes:

an action button next to a vehicle that upon being activated commands the vehicle to move to a predetermined location.

14. The augmented reality system of claim 8, wherein the displayed control includes:

an action button next to a vehicle that upon being activated commands the vehicle to perform a series of operations.

15. An augmented reality system for identifying and controlling an apparatus located within an environment comprising:

one or more sensors coupled to the apparatus;

a tracking system that obtains viewpoint information corresponding to a real-time view of said environment;

a processing system that receives information from said one or more sensors, where the information includes sensor location information and status information about the apparatus, and generates graphics using said sensor location information and said viewpoint information, wherein the graphics include visual representations of said status information and controls;

a display that displays the generated graphics such that the graphics are superimposed on the real-time view, wherein the graphics appear attached to the apparatus; and an interaction device that activates a displayed control.

16. The augmented reality system of claim 15, wherein the apparatus is a robotic device and the interaction device controls the robotic device.

* * * * *